United States Patent [19]

Ichikawa et al.

[11] Patent Number: 4,938,316

[45] Date of Patent: Jul. 3, 1990

[54] LUBRICATING DEVICE

[75] Inventors: Minoru Ichikawa, Owariasahi; Kotaro Kashiyama, Inuyama; Tomomitsu Furukawa, Nagoya, all of Japan

[73] Assignee: Daido Metal Company, Ltd., Nagoya, Japan

[21] Appl. No.: 295,799

[22] Filed: Jan. 11, 1989

[30] Foreign Application Priority Data

Feb. 3, 1988 [JP] Japan .................................. 63-23512

[51] Int. Cl.$^5$ .......................... F16N 7/14; F16N 7/36; F16N 13/10
[52] U.S. Cl. ................................... 184/27.2; 184/27.1
[58] Field of Search ...................... 184/26, 27.1, 27.2

[56] References Cited

U.S. PATENT DOCUMENTS 4,458,644  7/1984  Papst .................................. 184/27.2
4,629,033  12/1986  Moore et al. ...................... 184/27.2

FOREIGN PATENT DOCUMENTS 58-47596  10/1983  Japan .
59-19243  5/1984  Japan .

Primary Examiner—Allen M. Ostrager

[57] ABSTRACT

A lubricating device for intermittently supplying a lubricating fluid to a plurality of portions to be lubricated comprises a gear pump, a plunger pump, and an electronic control unit for controlling actuation and suspension of the gear pump. The plunger pump includes a flow passage connected to an outlet port of the gear pump, a selector valve unit connected to the flow passage, a piston unit connected to the selector valve unit and an outlet port connected to the piston unit.

6 Claims, 3 Drawing Sheets

FIG. I

LUBRICATING DEVICE

BACKGROUND OF THE INVENTION

The present invention relates to a lubricating device for intermittently supplying a lubricating fluid to the portions to be lubricated in sliding portions of various elements for use in machining tools, industrial equipments and power machines.

There are known two types of conventional lubricating devices using plunger pumps. The first type lubricating device as shown in FIG. 1 of Japanese Patent Publication No. 59-19243(1984), for example, includes a transmission mechanism which reduces the rotational speed of a drive motor, converts rotational motion of the motor to reciprocal swing motion of a plunger of the plunger pump through a cam and a lever, and then transmits the reciprocal swing motion. The second type lubricating device is of a fixed displacement, variable pressure type having a gear pump and a plunger pump in combination as shown in FIG. 2 of Japanese Patent Publication No. 58-47596(1983), for example.

In any of those two types of lubricating devices, the plunger pump serves to deliver and supply a lubricating fluid to the portions to be lubricated, and the delivery amount of lubricating fluid is determined by the diameter of the cylinder and the shift amount of the plunger. The shift amount of the plunger through which it can move upward from the bottom of the cylinder is determined by shape and length of the swing lever as well as cam parameters in the former lubricating device, and by ON-OFF cycles of the drive motor corresponding to ON-OFF switching of a microswitch effected upon the distal end of the plunger striking against the microswitch in the latter lubricating device.

In the aforementioned lubricating devices, the delivery pressure of lubricating fluid directed to the portions to be lubricated is determined by the stored resiliency of a spring situated in the upper portion of the plunger. As the stored resiliency is varied with changes in the delivery amount (i.e., the shift amount of the plunger), the steady delivery pressure cannot be assured. Further, since in any of the aforementioned lubricating devices the spring resiliency is required to provide the minimum delivery pressure, several springs with different spring constants are needed to assure the desirous stored resiliency for a wide range of the delivery amount. The supply suspension time of lubricating fluid directed to the portions to be lubricated is determined by a speed reducing mechanism for operating the cam, which in turn shifts the swing lever, in the former lubricating device, and an electric timer is employed in the latter lubricating device. Therefore, a limitation is imposed in setting of the suspension time and the cost is increased, respectively.

With the latter lubricating device which employs a gear pump and a plunger pump in combination, a period of time in which a lubricating fluid of predetermined amount is stored in the plunger pump is varied dependent on viscosity of the lubricating fluid. For this reason, this type lubricating device cannot be used in those cases where the supply timing of the lubricating fluid should be determined accurately.

SUMMARY OF THE INVENTION

The present invention is to provide a lubricating device which comprises a gear pump and a plunger pump, and intermittently supplies a lubricating fluid to a plurality of portions to be lubricated, wherein the lubricating device also includes an electronic control unit for controlling actuation and suspension of the gear pump, and the plunger pump includes a flow passage connected to an outlet port of the gear pump, a selector valve unit connected to the flow passage, a piston unit connected to the selector valve unit, and an outlet port connected to the piston unit.

DESCRIPTION OF THE PREFERRED EMBODIMENTS

Figure 1:
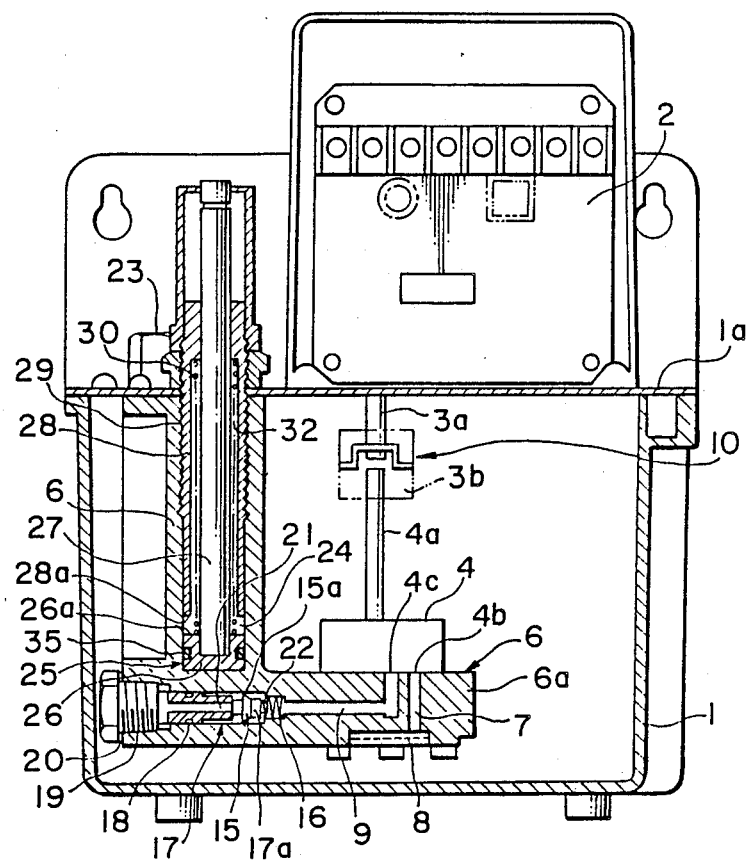
FIG. 1 is a longitudinal sectional view of a lubricating device according to an embodiment of the present invention.
Figure 2:
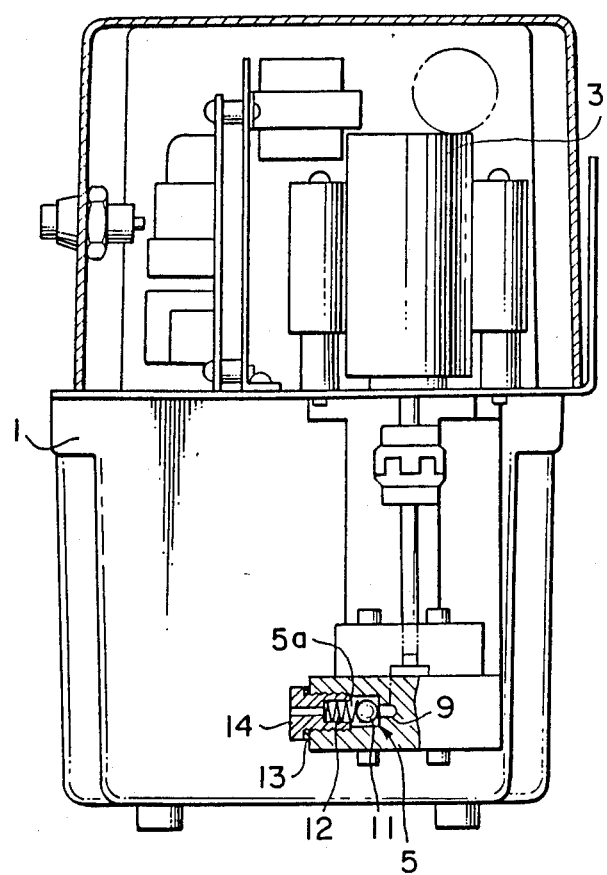
FIG. 2 is a transverse sectional view of the lubricating device shown in FIG. 1.

With reference to FIGS. 1 and 2, there is shown a lubricating device 10 according to an embodiment of the present invention, which is mounted on a tank cover 1a fixed to the top of a lubricating oil tank 1. The lubricating device 10 includes an electric motor 3 fixed to the tank cover 1a, a gear pump 3 situated near the bottom of the tank 1, a plunger pump 6 fixed to the tank cover 1a, and an electronic control unit 2.

The electric motor 3 has a capability of delivering a set amount of lubricating oil, including even such lubricating oil as having viscosity of 2,000 cst, to the plunger pump 6 within a preset energizing time, e.g., 4 seconds, and can be of a type which is compatible with single-phase power supply of 100 V and which has output power of approximately 10 W and rotational speed of 2,400 rpm, for example. An output shaft 3a of the electric motor is extended through the tank cover 1a and connected to a drive shaft 4a of the gear pump 4 through a shaft coupler 3b for transmitting the power to the gear pump 4.

The gear pump 4 is fixed to a body 6a of the plunger pump 6 such that the drive shaft 4a is aligned concentrically with the output shaft 3a of the electric motor. Also, the gear pump 4 has an inlet port 4b and an outlet port 4c formed therein.

The plunger pump 6 includes the body 6a, an intake flow passage 7 formed in the body 6a to have one end facing the inlet port 4b of the gear pump, an intake filter 8 disposed at the opposite end of the intake flow passage 7, another flow passage 9 communicating with the outlet port 4c of the gear pump 4, a selector valve 17, a pressure control valve 5 situated between the flow passage 9 and the selector valve 17, and a piston unit 25. The intake filter 8 can be formed of a plastic filter with mesh size of 30 $\mu$m, for example.

The selector valve 17 includes a spring 16, a valve body 15, an O-ring 18, a selector port bolt 19, and a packing 20. The valve body 15 is provided with a lip 15a which can be inclined in the direction of flow of the lubricating oil. The lip 15a serves to normally close a selector port passage 21 formed in the selector port bolt 19. The selector port passage 21 is communicated with an outlet port 23 through which lubricating oil is supplied to the portions to be lubricated outside the lubricating device 10.

The pressure control valve 5 disposed midway the selector port passage 21 includes a pressure control valve chamber 5a, a steel ball 11, a spring 12, and a packing 13.

The pressure control valve 5 is set to have a limit higher about 0.5-1 Kg f/cm² than the setting delivery pressure of the plunger pump.

The piston unit 25 includes a cylinder chamber 24, a piston 26 sealed by an O-ring 26a, an indicator rod 27 fixed to the piston 26, an adjusting sleeve 28 arranged in the cylinder chamber to surround the indicator rod 27, and a compression spring 30 arranged in a spring chamber 32 defined between the adjusting sleeve and the indicator rod for pushing the piston. It should here be noted that the compression spring 30 will not be compressed to such an extent as beyond the length of the spring chamber 32 even when it is compressed at maximum. The adjusting sleeve 28 is fixed by means of a screw 29 at an adjusted position in the axial direction of the cylinder chamber 24. The indicator rod 27 is loosely fitted in the upper portion of the adjusting sleeve 28 with clearance in a range of 10-25 μm left therebetween, and is movable up and down in response to movement of the piston 26 in the cylinder chamber 24, thereby allowing visual check of the intake and delivery strokes of the plunger pump 6, while guiding slide movement of the piston 26.

In operation, when the electric motor 3 is energized, the gear pump 4 rotates and the lubricating oil under pressure delivered from the rotating gear pump 4 flows into the selector valve chamber 17a through the flow passage 9. With inflow of the lubricating oil, the lip 15a of the valve body 15 of the selector valve 17 is inclined in the direction of flow of lubricating oil, and the valve body 15 is strongly pressed against the selector port bolt 19 while being pushed by an urging force of the spring 16 plus inflow of the lubricating oil, so that the selector port passage 21 is sealed completely. Therefore, the lubricating oil will not flow into the outlet port 23 communicating with the portions to be lubricated, and instead flows into the cylinder chamber 24 for pushing the piston 26 upward. The indicator rod 27 fixed to the piston 26 is also thereby moved to allow visual check of the strokes of the plunger pump 6 as well as to guide movement of the piston 26 through fitting thereof with the adjusting sleeve 28. In this way, the lubricating oil continuously flows into the cylinder chamber 24 until an upper end 26a of the piston 26 comes into contact with a lower end 28a of the adjusting sleeve 28. On the other hand, the compression spring 30 is compressed in the adjusting sleeve 28 as the piston 25 ascends, and the compressed amount of the spring 30 is determined by the length of the spring chamber 32 defined in the adjusting sleeve 28, so that the delivery pressure is kept constant. The delivery amount is set dependent on a position of the adjusting sleeve in the axial direction of the cylinder chamber, and that position can be controlled by tightening or loosening the screw 29 with respect to the adjusting sleeve. If the gear pump 4 continues to operate causing the lubricating oil to flow into the cylinder chamber 24 even after abutment of the upper end 26a of the piston against the adjusting sleeve, the pressure in the cylinder chamber tends to rise, but this pressure is kept below a certain level by the action of the pressure control valve 5.

Normally, the capability of the gear pump 4 and the energizing time of the electric motor 3 are controlled by the electronic control unit 2 such that the amount of lubricating oil not less than 6 cc can be delivered even in case of using lubricating oil having a viscosity of 2,000 cst.

After the set amount of lubricating oil has been introduced into the cylinder chamber 24, the electric motor 3 is suspended in response to the stop command from the electronic control unit 2. At the same time, delivery of the lubricating oil from the gear pump 4 is also suspended, whereupon the compression spring 30 starts to extend causing the piston 26 to be pushed downward. The lubricating oil in the cylinder chamber is caused to thereby flow into the selector valve chamber 17a inversely. At this time, the lip 15a on the valve body 15 of the selector valve is caused to spread by the inverse flow of the lubricating oil, so that the lubricating oil is blocked from flowing inversely toward the gear pump 4 through the flow passage 9. As a result, the lubricating oil passes through the selector port passage 21 of the selector port bolt 19 and is then delivered from the outlet port 23 in the body 6a of the plunger pump for being supplied to the portions to be lubricated outside the lubricating device. After the completion of delivery from the plunger pump, the electronic control unit issues drive command again upon elapse of the preset suspension time for starting a next lubrication cycle.

Figure 3:
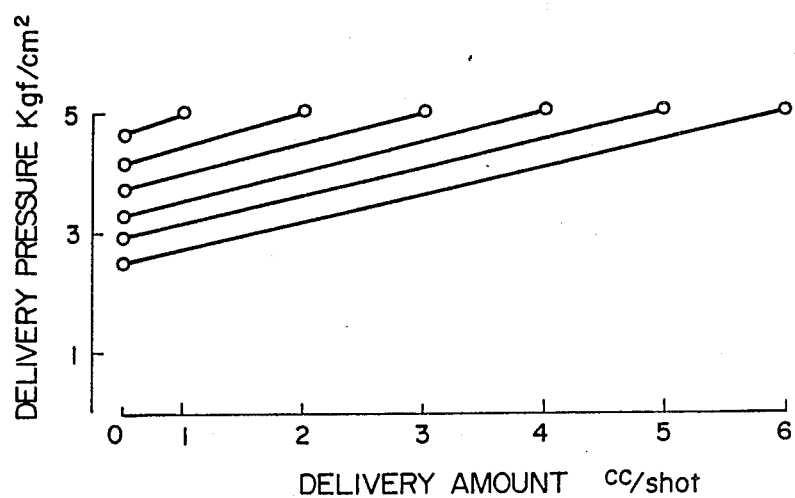
FIG. 3 is a graph showing a relationship between the delivery amount and the delivery pressure in the lubricating device of the present invention.

With reference to FIG. 3, there is plotted the delivery pressure varying with changes in the delivery amount in case of using the lubricating device of the present invention. Because the maximum value of the stored spring resiliency is held fixed by the presence of the adjusting sleeve, the pressure at the start of delivery remains unchanged regardless of variations in the delivery amount. In other words, it is assured that even in case of small amount delivery, not only the pressure at the start of delivery is high, but also the pressure at the end of delivery is so high. Therefore, the lubricating oil can certainly be supplied to the portions to be lubricated.

Also when the delivery amount is large, delivery can start at the same pressure, thereby eliminating the need of taking into account an adverse effect of the difference in delivery pressure upon a distributor valve or the like used for supplying the lubricating oil to the portions to be lubricated.

Figure 4:
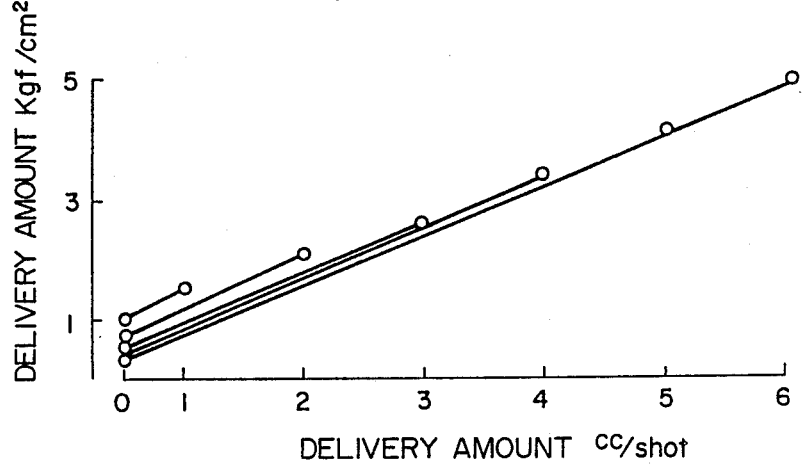
FIG. 4 is a graph showing the relationship between the delivery amount and the delivery pressure in a lubricating device of the prior art.

FIG. 4 shows changes in the delivery pressure in case of using a lubricating device of the prior art. It will be seen that the pressure at the start of delivery is varied with changes in the delivery amount, and the pressure at the end of delivery is also varied dependent on the setting of spring constants.

Further, as the delivery amount becomes smaller, the delivery pressure is reduced, which makes it harder to certainly supply the lubricating oil to the portions to be lubricated.

The present invention offers the advantages as follows.

(1) Since the adjusting sleeve is provided according to the present invention, the delivery pressure is less varied with changes in the delivery amount as compared with the prior lubricating device of plunger type, and the delivery pressure enough to certainly feed the lubricating oil to the portions to be lubricated can be assured even in case of small amount delivery.

(2) While the prior lubricating device of plunger type required several cylinders corresponding to the respective delivery amounts divided into two ranges of 1 to 3 cc and 3 to 6 cc, for example, in order to achieve a match between the capability of a compression spring for delivery and the cylinder diameter, the present invention can deal with the delivery amount of 1 to 6 cc using a single cylinder because the compressed amount of the delivery spring disposed in the adjusting sleeve is held constant.

(3) With the prior lubricating device of plunger type using a speed reducing mechanism, it was troublesome to set the suspension time to any selected period, because the suspension time is determined by the speed reducing mechanism and one cam is required for each suspension time to be set. In contrast, several periods of suspension time can be selected and set by the electronic control unit in the present invention.

(4) According to the present invention, since the delivery capability and the driving time of the gear pump are set in conformity with the case where the lubricating device would be operated at the maximum delivery amount using lubricating oil of high viscosity, it becomes possible to supply the lubricating oil at the finely adjustable timing.

What is claimed is:

1. A lubricating device mounted on a tank cover fixed to a lubricating oil tank for intermittently supplying a lubricating fluid to a plurality of sliding portions to be lubricated in machining tools, industrial equipment and power machines comprising:
    an electric motor energizingly connected to a rotating gear pump disposed near a bottom of said tank, a plunger pump fixed to the tank cover; and
    an electronic control unit for controlling actuation and suspension of said gear pump;
    wherein said plunger includes an oil flow passage 9, in communication with an outlet port of said gear pump, to cause oil under pressure to flow into a selector valve unit 17, connected to said flow passage, a piston unit 25, connected to said selector valve unit and an outlet port connected to said piston unit.

2. A lubricating device according to claim 1, wherein said selector valve unit includes a selector valve chamber, a valve body accommodated in said selector valve chamber, a selector port bolt, and a spring urging said valve body toward said selector port bolt.

3. A lubricating device according to claim 2, wherein said valve body is provided with a lip adapted to prevent the lubricating fluid from flowing into said flow passage, said selector port bolt having formed therein a selector port passage, of which one end can be closed by said valve body, and wherein said selector port passage is connected to said outlet port of said plunger pump.

4. A lubricating device according claim 1, wherein said piston unit includes a cylinder chamber, a piston accommodated in said cylinder chamber, an adjusting sleeve accommodated in said cylinder chamber and adjustable in its position in the axial direction of said cylinder chamber, and a compression spring for urging said piston.

5. A lubricating device according to claim 4, wherein said piston has one end communicating with said selector valve chamber downstream of said valve body of said selector valve unit and another end to which an indicator rod is fixed, and said compression spring is accommodated in a spring chamber defined between said indicator rod and said adjusting sleeve.

6. A lubricating device according to claim 1 wherein said lubricating device includes a pressure control valve disposed in said flow passage upstream of said selector valve unit to prevent the pressure of the lubricating fluid in said flow passage from exceeding a certain value.

* * * * *